(No Model.)

W. HAAS.
STUFFING BOX FOR VALVE STEMS, &c.

No. 275,484.  Patented Apr. 10, 1883.

WITNESSES:
A. Schehl.
Otto Risch.

INVENTOR
William Haas
BY Paul Goepel
ATTORNEY

UNITED STATES PATENT OFFICE.

WILLIAM HAAS, OF NEW YORK, N. Y.

STUFFING-BOX FOR VALVE-STEMS, &c.

SPECIFICATION forming part of Letters Patent No. 275,484, dated April 10, 1883.

Application filed February 14, 1883. (No model.)

*To all whom it may concern:*

Be it known that I, WILLIAM HAAS, of the city, county, and State of New York, have invented certain new and useful Improvements in Stuffing-Boxes for Valve-Stems and Piston-Rods, of which the following is a specification.

This invention has reference to an improved stuffing-box for valve-spindles, piston-rods, and other purposes; and it consists of a stuffing-box or gland having an annular or spiral channel around the valve-spindle or piston-rod, and a lateral opening or openings, in combination with one or more sliding pistons and means for screwing in the pistons, so as to adjust the packing tightly around the spindle or piston-rod.

Figure 1:
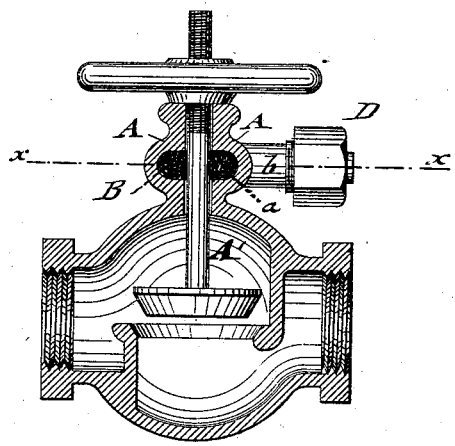
Figure 2:
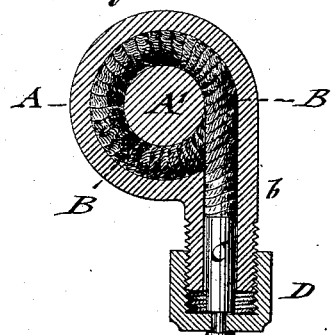

In the accompanying drawings, Figure 1 represents a vertical longitudinal section of a globe-valve with my improved stuffing-box around the valve-spindle. Fig. 2 is a horizontal section through the stuffing-box on line $xx$, Fig. 1; and Fig. 3 is a vertical longitudinal section of a stuffing-box as applied to the piston-rod of a steam-cylinder.

Similar letters of reference indicate corresponding parts.

A in the drawings represents the enlarged gland of my improved stuffing-box for valve-spindles and piston-rods, which gland is provided with an interior annular or spiral channel, $a$, that extends around the valve-spindle or piston-rod A', as the case may be. The annular or spiral channel $a$ is provided with a lateral channel or channels, $b$, tangential to the channel $a$, through the open end or ends of which a suitable packing material, B, is forced in by means of a solid piston, C, the diameter of which is equal to the interior diameter of the channel $b$. The exterior grooved stem $d$ of the piston C passes through a center opening of a screw-cap, D, and is engaged by the latter, so as to move it forward or backward, according as the screw-cap D is turned in one or the opposite direction on an exterior screw-thread of the tangential channel $b$ of the stuffing-box A. By moving the piston C forward by a few turns of the screw-cap D, the packing B is tightly pressed around the valve-spindle or piston-rod A'. By giving from time to time the screw-cap and piston a few turns the packing is pushed forward, so as to keep the valve-spindle or piston-rod always tightly packed.

Figure 3:
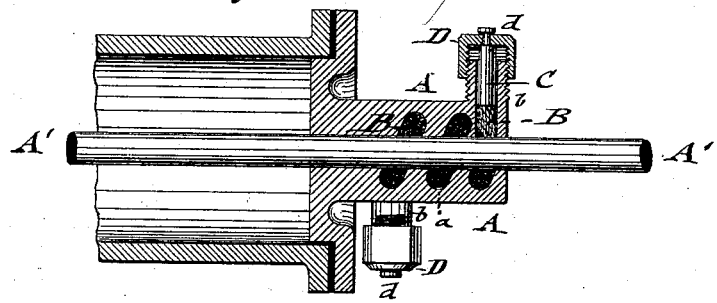

In case a spiral channel, $a$, is used—as in stuffing-boxes for piston-rods—a lateral tangential channel, $b$, is used at both ends of the channel $a$, so that the packing in the spiral channel may be thoroughly compressed from opposite ends by means of the pistons and screw-caps at both ends of the channel $a$, and thus be tightly applied to the piston-rod, as shown in Fig. 3. In this manner a reliable and tightly-closing stuffing-box for valve-spindles and piston-rods is furnished, in which the packing can be readily adjusted whenever steam should escape by simply giving the screw cap or caps a few turns and pressing thereby the packing material tightly around the spindle or piston-rod.

I am aware that a stuffing-box in which the packing is fed forward by a tangential screw has been used heretofore, and I therefore do not claim the same, broadly; but I have found by experience that the packing settled into the interior screw-thread of the tangential extension, and could not thereby be properly fed forward by the tangential screw. This I have entirely avoided by my construction, in which the packing is adjusted by a screw-cap that engages an exterior screw-thread of the extension-channel and by a piston that moves along the smooth interior surface of the same.

Having thus described my invention, I claim as new and desire to secure by Letters Patent—

As an improvement in stuffing-boxes for valve-spindles and piston-rods, the combination of the stuffing-box, having a gland with an interior annular or spiral channel, and a tangential extension-channel at one or more points, with interior packing material, and with a piston arranged in the tangential extension channel or channels, said piston being actuated by a screw-cap taking into an exterior screw-thread of the tangential extension-channel, substantially as and for the purpose set forth.

In testimony that I claim the foregoing as my invention I have signed my name in presence of two subscribing witnesses.

WILLIAM HAAS.

Witnesses:
PAUL GOEPEL,
SIDNEY MANN.